Nov. 4, 1958  R. A. WITTREN  2,858,848
FLUID LINE COUPLING FOR HYDRAULIC CONTROL SYSTEMS
Filed June 12, 1956  4 Sheets-Sheet 1

INVENTOR.
R. A. WITTREN

Nov. 4, 1958 R. A. WITTREN 2,858,848
FLUID LINE COUPLING FOR HYDRAULIC CONTROL SYSTEMS
Filed June 12, 1956 4 Sheets-Sheet 2

INVENTOR.
R. A. WITTREN

Nov. 4, 1958  R. A. WITTREN  2,858,848
FLUID LINE COUPLING FOR HYDRAULIC CONTROL SYSTEMS
Filed June 12, 1956  4 Sheets-Sheet 3
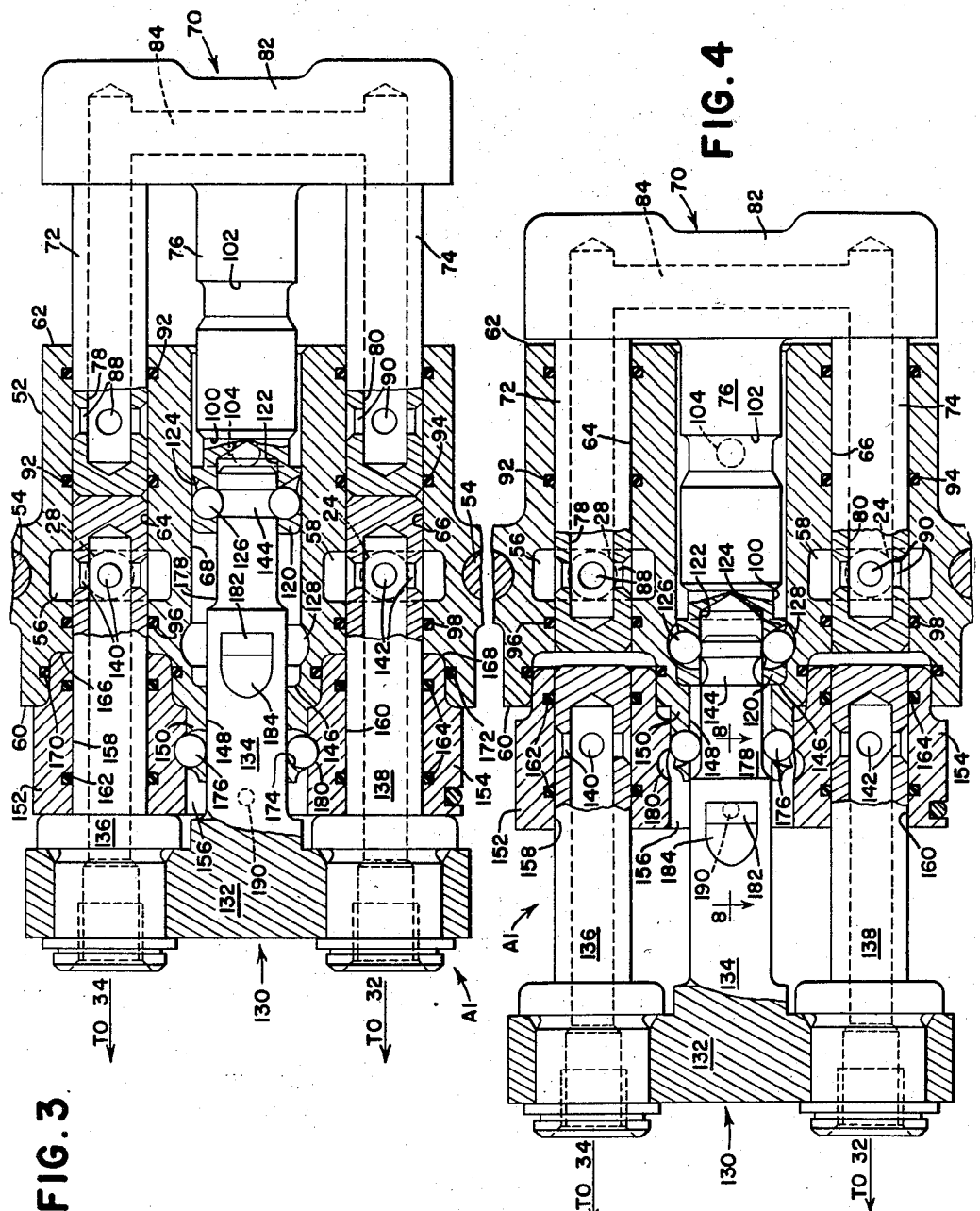
INVENTOR.
R. A. WITTREN Nov. 4, 1958 R. A. WITTREN 2,858,848
FLUID LINE COUPLING FOR HYDRAULIC CONTROL SYSTEMS
Filed June 12, 1956 4 Sheets-Sheet 4

INVENTOR.
R. A. WITTREN

United States Patent Office 2,858,848
Patented Nov. 4, 1958

2,858,848

FLUID LINE COUPLING FOR HYDRAULIC CONTROL SYSTEMS

Richard A. Wittren, Cedar Falls, Iowa, assignor, by mesne assignments, to Deere & Company, a corporation of Delaware Application June 12, 1956, Serial No. 590,993

23 Claims. (Cl. 137—599.1)

This invention relates to a hydraulic control system and more particularly to a fluid line coupling having particular utility in the association with and disassociation from said system of a remote fluid motor.

One of the principal fields in which the invention is particularly useful is that involving hydraulic control systems on agricultural tractors. For purposes of orientation, reference is had to a generally comparable system in U. S. Patent 2,532,552, wherein there is shown an agricultural tractor having an integral or built-in cylinder of the one-way type, together with a valve box including means for connecting the fluid lines of a remote two-way motor. In that particular arrangement, when the fluid lines for the remote motor are plugged into the valve box, the one-way cylinder is cut-out. According to the present invention, the integral or built-in cylinder is available for operation, in one form of the invention, in parallel with the remote cylinder and, in another form of the invention, in series with the remote cylinder. The foregoing arrangement is achieved by a design that forms a principal object of the present invention.

The invention has for another object the utilization of a coupling part which controls the relationship between the fluid lines for the system according to whether or not the remote cylinder is used. In any system of the general character referred to, problems involved in connecting and disconnecting fluid lines inescapably include the sealing of the fluid lines against loss of fluid and against the entry of dirt. According to this invention, a novel means accomplishing the desired result is provided. The design features also a supporting block in which a pair of elements are movable, these elements being interconnectible so that movement thereof controls detent or equivalent releasable locking means therebetween through certain ranges, depending upon the result desired. Hence, in the coupling of the component parts, one part engages and moves the other part to a new position. Upon uncoupling, the first part retains engagement with the second part and returns the second part to its original position. This automatically involves the solution of the problem of sealing the fluid lines against the escape of fluid and against the entrance of dirt, particularly in those cases in which uncoupling is inadvertent, as when excess tension is applied to the hose lines.

The foregoing and other important objects and desirable features inherent in and encompassed by the invention will become apparent as preferred embodiments thereof are disclosed in detail in the ensuing specification and accompanying sheets of drawings, the several figures of which will be described immediately below.

Fig. 3 is an enlarged section as seen along the line 3—3 of Fig. 1.

Fig. 4 is a similar section but showing the parts substantially in uncoupled positions.

Figure 9:
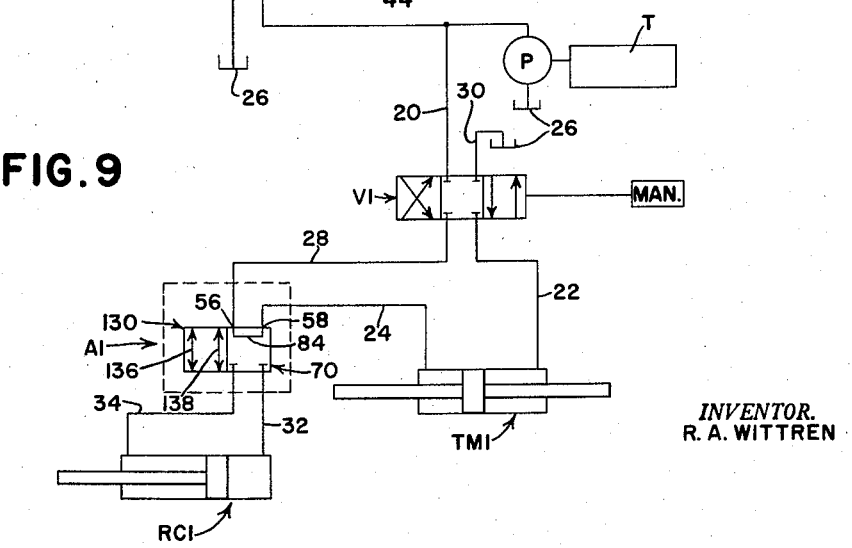
Fig. 9 is a schematic view of the circuits involved.

For the purpose of effecting a brief outline of what is involved here, reference is directed first to the schematic illustration in Fig. 9. As seen in that figure, a pump P is driven by any suitable power source, such as a tractor engine T and furnishes fluid under pressure for a pair of tractor-mounted or integral motors TM1 and TM2. The circuit also includes provision for connection thereto of a pair of remote cylinders RC1 and RC2. The circuit illustrated is of the constant pressure type; although, this does not limit the applicability of the invention. The motor TM1 is of the two-way type, whereas the motor TM2 is a one-way motor. This is broadly immaterial, except that in a specific sense, the motor TM1 is connected in series with the remote cylinder RC1, and the motor TM2 is connected in parallel with the motor RC2. The motors TM1 and RC1 are controlled by a manually operated control valve V1, and another valve V2 is used to control the other motors TM2 and RC2. The remote motors are connected into the circuit respectively by fluid line coupling assemblies A1 and A2, each of which includes components, to be described below, operating as valve means for connecting or disconnecting the respective motors RC1 and RC2.

For example, as will be seen in Fig. 9, the valve V1 is in a neutral position in which fluid under pressure is not supplied to either motor TM1 and RC1. The fluid line coupling A1 is arranged in a position in which the remote cylinder RC1 is cut-out of the circuit. If the valve V1 is shifted to the right, for example, as seen in Fig. 9, the high pressure line 20 will be connected across the valve to a motor line 22, which will cause the piston in the motor TM1 to move to the left. Fluid returning from the motor TM1 via the line 24 will pass through the coupling A1 at 84 and return to the low side or reservoir of the system at 26 via lines 28 and 30. Movement of the valve V1 to the left of its neutral position as shown in Fig. 9 will reverse the operation of the motor TM1.

When the remote motor RC1 is plugged into the circuit, the result can be schematically considered on the basis of a setting of the coupling A1 to the right of the position shown in Fig. 9, in which the left hand portion of the coupling will connect the lines 24 and 28 respectively at 136 and 138 to remote cylinder lines 32 and 34. This will place the remote cylinder in series with the motor TM1. Hence, movement of the valve V1 to the right, as assumed above, will effect the transmission of fluid under pressure from the line 20 to the left hand end of the motor RC1 via the lines 28 and 34, fluid returning from the right hand end of the motor RC1 traveling through the lines 32 and 24 to the left hand end of the motor TM1, causing movement of the motor piston in TM1 to the right. Fluid exhausted from the right hand end of the motor TM1 returns to the reservoir via 22 and 30.

In the upper portion of the figure, as previously stated, the remote cylinder RC2 is connected in parallel with the motor TM2. With the coupling A2 arranged as illustrated, the motor RC2 is cut-out of circuit and operation of the valve V2 to the right or left of the position shown in the figure will actuate only the motor TM2. For example, the valve V2 is shiftable to the left to connect the motor TM2 to the high-pressure line 20 via a motor line 36. Since the motor TM2 is of the one-way type, the line 36 is also a return line when the valve V2 is shifted to the right of its Fig. 9 position, at which time the line 36 is connected to a return line 38. As will be seen, the motor RC2 is not affected, since the coupling A2 is set to preclude operation thereof.

However, when the coupling is otherwise arranged, on the basis of a shifting to the left of the schematic coupling shown in Fig. 9, the motor line 36 for the motor TM2 is connected via 40 and the coupling A2 to a remote motor line 42, and the low pressure line 38 is connected via a line 44 and the coupling A2 to a second remote motor line 46. Therefore, operation of the valve V2 will effect operation of both motors TM2 and RC2, but in parallel, as distinguished from the series operation of the motors TM1 and RC1.

The boxes respectively associated with the valves V1 and V2 are identified by the legend "MAN." to indicate that they are manually operated. In a commercial embodiment, the valves could be otherwise operated. Likewise, components in addition to those illustrated would be involved, such as means for re-phasing the remote cylinders as respects the tractor cylinders. However, these details are immaterial to the disclosure of the present invention.

Figure 1:
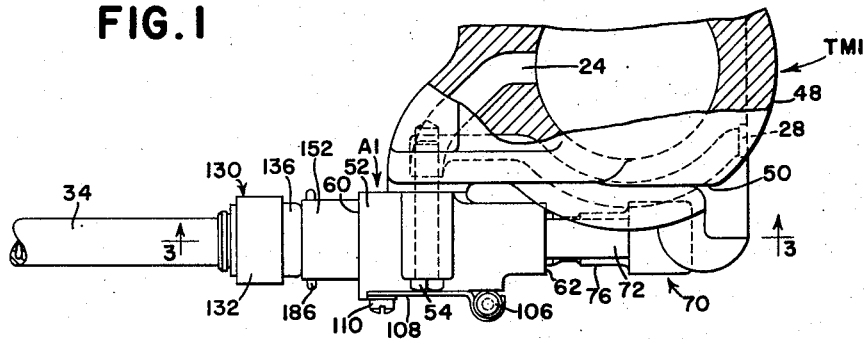
Fig. 1 is a plan, partly in section, of the fluid line coupling arrangement.
Figure 2:
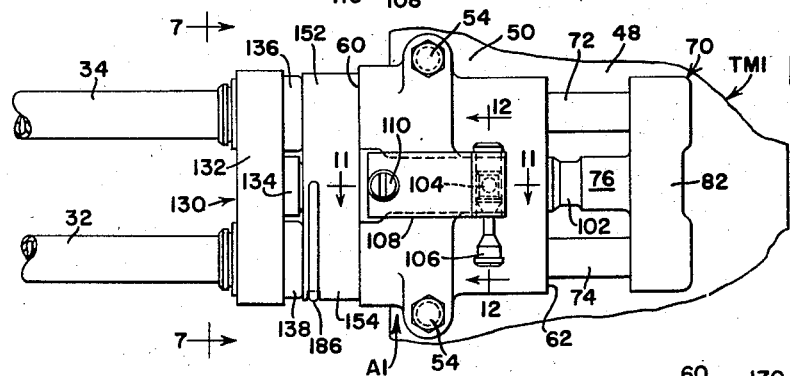
Fig. 2 is an elevation of the structure shown in Fig. 1.

Fig. 1 illustrates a plan, partly in section, of the relationship between the motor TM1 and the coupling assembly A1. As will be seen, the motor TM1 comprises a cylinder 48 having an external mounting face 50 to which a coupling block 52 is secured as by a plurality of cap screws 54. The purpose of the removability of the coupling block 52 is to enable theb lock to be replaced by a suitable cover, not shown, in the event that the coupling block is not used, whereby the motor TM1 may be operated irrespective of its possible association with a remote motor such as that at RC1. As best shown in Figs. 1 and 3, mounting of the coupling block 52 on the cylinder mounting face 50 involves the correlation of fluid passages, the particular passages involved being, as to the cylinder 48, the lines 28 and 24, previously referred to (Fig. 9). In Fig. 1, a portion of the cylinder has been broken away to disclose the line 24 and the line 28 is shown in dotted lines. Dotted circles in Fig. 3 indicate the respective locations of these lines 24 and 28. The coupling block 52 is cored respectively at 56 and 58 for register with the pasages 28 and 24. The numerals 56 and 58 are also applied to the schematic view (Fig. 9).

For purposes of convenience in the ensuing description, reference will be made to the block as having front and rear ends, as at 60 and 62, but these, as well as other geographical limitations, here and in the claims, are used as expressions of convenience and not as importing any limits on the scope of the invention. Normally, the remote cylinder when used with an agricultural tractor, for example, will be at the rear; although, here again, nothing precludes the use of these cylinders at fore parts of the tractor.

The block 52 has upper and lower fore-and-aft extending plug bores 64 and 66 (Fig. 3) which, of course, open respectively at the front and rear ends 60 and 62 of the block. These bores respectively communicate with the fluid passages 56 and 58, as will be obvious. The block 52 further has a fore-and-aft extending pilot bore 68 which is, of course, parallel to the plug bores 64 and 66.

A rear coupling element 70 is disposed behind the block 52 and has a pair of forwardly extending plug members 72 and 74 and a central pilot member 76; these are respectively forwardly receivable in the plug and pilot bores 64, 66 and 68.

The plug members 72 and 74 are tubular and therefore respectively have fore-and-aft passages 78 and 80, and the interconnecting body portion, as at 82, of the element 70 has a cross passage which interconnects the passages or bore 78 and 80 and forms the coupling circuit portion 84 previously referred to. The forward ends of the bores or passages 78 and 80 are blind, but the walls of the tubes are radially drilled to provide a plurality of radial passages 88 for the passage 78 and a plurality of similar radial passages 90 for the bore or passage 80. The tubular plug members 72 and 74 are respectively slidable fore-and-aft in the plug bores and in conjunction with a portion of the pilot member 76, to be hereinafter described, mount the element 70 for movement between front and rear positions, the rear position being shown in Fig. 3 and the front position in Fig. 4. Appropriate seals, as at 92 and 94, seal the plug bores 64 and 66 and the respective plug elements 72 and 74.

When the coupling element 70 is in its forward position (Fig. 4), the motor lines 28 and 24 are interconnected by the passages 78—84—80, which produces the circuit set-up shown in Fig. 9 as actually illustrated. The numeral 84 is applied in that figure to show the cross connection of the passages 56 and 58, which should suffice for present purposes. Hence, the element 70 may be said to operate as a valve for selectively cutting the remote cylinder RC1 in or out. That is to say, in the Fig. 4 position, the remote cylinder RC1 is cut-out of the circuit and the motor TM1 may be operated independently of the motor RC1. In view of the fluid transfer from 56 to 58, the seals 92 and 94 are important, as are forwardly located seals 96 and 98 which respectively encircle the blind front ends of the plug members 72 and 74 when the element 70 occupies its front or Fig. 4 position.

Figure 11:
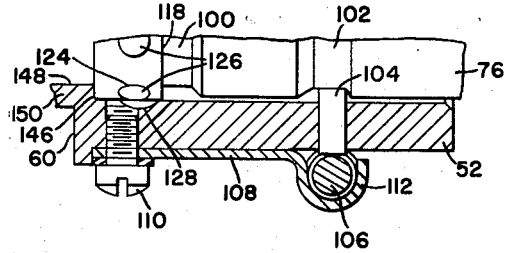
Fig. 11 is an enlarged section as seen along the line 11—11 of Fig. 2.
Figure 12:
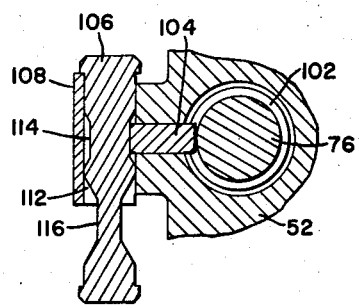
Fig. 12 is a section as seen along the line 12—12 of Fig. 2.

For the purpose of maintaining the two positions of the element 70, selectively, the pilot member 76 is formed with a pair of fore-and-aft spaced apart annular detent grooves 100 and 102, either of which is cooperative with a detent pin or plunger 104 (Fig. 11) slidably carried in a side wall portion of the block 52 and controlled by an operating plunger 106. A biasing member in the form of a spring 108 is secured to the side wall of the block 52 by a cap screw 110 and has a hooked end 112 embracing the plunger 106. As best shown in Fig. 12, the plunger 106 is of multi-diameter, having an upper portion 114 of relatively large diameter and a lower portion 116 of relatively smaller diameter. When the plunger 106 occupies the position shown in Fig. 12, the detent pressure on the plunger 104 is sufficient to normally retain the element 70 against rearward separation from the block 52, particularly when the detent plunger 104 engages the forward groove 100, since the forward groove has a radial shoulder 118 which prevents rearward separation of the element 70 unless the plunger 104 is withdrawn. However, rearward separation of the element 70 from the block 52 may be effected by forcing the plunger 106 upwardly so that its small-diameter section 116 is opposite the detent plunger 104, whereupon the detent plunger may be withdrawn sufficiently from the forward groove 100 to enable rearward separation as indicated. The position of the detent plunger 104 is illustrated by a dotted circle in each of Figs. 3 and 4, from which it will be seen that when the element 70 is in its rear position (Fig. 3) the detent plunger 104 engages the front groove 100; and when the element 70 is in its forward position (Fig. 4) the detent plunger 104 engages the rear annular groove 102.

The pilot member 76 on the element 70 has its forward end formed as a coaxial cylindrical head 120, axially bored to afford a forwardly opening rearwardly extending pocket or socket 122, thus affording the head 120 with a tubular wall which is radially drilled to provide a plurality of ball pockets 124, each of which contains a detent ball 126. The axis of each ball pocket 124 is preferably inclined as shown to modify the force components thereon and the pockets are appropriately shaped by staking or otherwise to prevent loss of the balls. When the element 70 is in its forward position (Fig. 4) the balls 126 are in radial register with an internal annular ball-receiving groove 128 in the element 52 and, of course, coaxial with the pilot bore 68. However, in the absence of a remote cylinder line carrier or connector 130, the balls 126 are substantially ineffective as respects the groove 128.

The carrier 130 comprises a main body 132 having, preferably integral therewith, a rearwardly extending central finger 134, and carrying upper and lower line tubes which form the coupling circuit portions 136 and 138, previously described in connection with Fig. 9. These tubes, hereinafter referred to as 136 and 138, extend rearwardly from the body 132 in parallelism with the finger 134 and each has a blind rear end but is provided short of said rear end with radial passages, as at 140 for the tube 136 and as at 142 for the tube 138. Reference to the members as "tubes," of course, does not exclude their construction in other forms.

The tubes 136 and 138 are secured to the body 132 of the element 130 in any appropriate manner to form, in effect, integral parts of the element. The front ends of the tubes are appropriately threaded or otherwise provided to receive suitable fittings for connection, respectively, to the remote cylinder motor lines 34 and 32. In the schematic illustration in Fig. 9, the numerals 136 and 138 are applied in such manner as to suggest the change in position of the coupling A1 when the remote cylinder RC1 is cut into the circuit. This result, in actuality, is achieved by moving the carrier 130 from the position of Fig. 4 to that of Fig. 3, the line tubes 136 and 138 being received respectively in the plug bores 64 and 66. When the carrier is moved rearwardly to the Fig. 3 position, the abutment means constituted by the blind rear ends of the line tubes engage the blind front ends of the plug tubes 72 and 74 and force the entire element 70 to the rear. One result of this movement is that the element 70 is moved to a position in which its openings 88 and 90 are displaced from communication with the block passages 56 and 58 and instead the openings 140 and 142 in the line tubes 136 and 138 are connected respectively to those passages. In other words, the passages 56 and 58 are now connected to the opposite ends of the motor RC1 rather than to each other. When the carrier 130 occupies the Fig. 3 position, the forward seals 96 and 98 cooperate with the external surfaces of the line tubes to establish effective seals.

The rear end of the finger 134 is provided with means cooperative with the releasable means established by the detent balls 126. To this end, the rear end of the finger is relieved by an annular groove 144 which receives the balls 126, following which the balls are retained in the groove 144 because they are confined by that portion of the pilot bore 68 that is of lesser diameter than the block groove 128. That is to say, when the carrier 130 occupies the position of Fig. 4, the extreme rear end of the finger 134 is operative to cam the balls 126 outwardly into the annular groove 128. Upon further rearward movement of the carrier—the element 70 being temporarily retained by the detent plunger 104 in the groove 102—the finger moves rearwardly so that the annular groove 144 therein lies in radial register with the balls 126. Continued rearward movement of the carrier then overcomes the detent force at 102—104 and as the element 70 and carrier 130 move together, the balls are confined by the pilot bore 68. Thus, axial force is transmitted from the carrier 130 to the element 70 not only by the abutting blind ends of the tubes 136 and 72 and 138 and 74 but also by the interlock at 126—144. Since a detent lock is established at 104—100 when the components occupy the Fig. 3 position, the carrier, as well as the element, is temporarily retained in its rear position. When it is desired to disconnect the remote cylinder, the carrier 130 is moved forwardly and, since the balls 126 are confined by the bore 68 to the groove 144, forward movement of the carrier 130 will entail forward movement of the element 70. The two will move together until the balls 126 are again in radial register with the block groove 128. By this time, the openings 140 and 142 respectively in the line tubes 126 and 138 are disconnected from the block passages 56 and 58 and the openings 88 and 90 in the plug tubes 72 and 74 are in communication with the passages 56 and 58. Therefore, there will be no loss of fluid during the interchange between coupled and uncoupled positions. Forward movement of the element 70 to its forward position as shown in Fig. 4 may be considered to be limited by engagement of the head 120 with a shoulder 146 afforded between the bore 68 and a reduced counterbore 148 in a forward coaxial extension 150 of the block 52.

Another feature of the coupling assembly is the provision of upper and lower closure members 152 and 154 respectively for the ends of the line tubes 136 and 138. Preferably, these two closure members are interconnected by a common body 156. The closure members, preferably considered as a single member 152—154, are movable between front and rear positions, as shown respectively in Figs. 3 and 4. In the front position, the closure member abuts the rear ends of the shoulders on the line tubes 136 and 138, and in the rear position the upper and lower parts 152 and 154 close the openings 140 and 142 in the rear ends of the line tubes. The closure member as a whole is slidably mounted on the carrier because the closure members themselves are individually bored at 158 and 160 for fore-and-aft sliding movement. Appropriate seals at 162 and 164 perform a typical sealing function.

In order that the closure member 152—154 may automatically assume its front and rear positions during the coupling and uncoupling of the assembly, the member is arranged so that upon rearward movement of the carrier 130 from its Fig. 4 position to its Fig. 3 position, the member 152—154 will automatically assume its forward position because of engagement with the front end 60 of the block 52. For this purpose, the front of the block is arranged to afford upper and lower circular recesses or pockets 166 and 168 that are respectively coaxial with the plug bores 64 and 66. The rear ends of the members 152 and 154 are correspondingly reduced to be received by these pockets, and annular seals 170 and 172 function to perfect the joint. Up to this point, it will be seen, then, that, with the member 152—154 in its Fig. 4 position, the rear end will engage the front end of the block 52 so that the member will be forced forwardly upon rearward movement of the carrier 130.

The means for automatically returning the member 152—154 to its rear position comprises releasable lock means associated between the block 52 and the body 156 of the member and controlled by the finger 134 on the carrier. To this end, then, the annular wall afforded by the coaxial block extension 150 is bored radially to provide a plurality of ball-receiving pockets 174, in each of which is carried a detent ball 176. The pockets 174 like those previously described at 124, have their axes inclined to modify the component forces developed in the movement of the balls radially inwardly and outwardly and these pockets are further formed, as by staking, to prevent loss of the balls 176. When the coupling components occupy the respective positions shown in Fig. 4, the balls 176 are radially inwardly accommodated by a reduced cylindrical portion 178 on the finger 134. Consequently, the balls 176 are out of engagement with an annular groove 180 formed in the member body 170. However, when the carrier is moved from the Fig. 4 position to that of Fig. 3, the balls 176 are caused to cam outwardly into the groove 180 as the transition is made from the reduced portion 178 to the main body portion of the finger 134, whereupon the member 152—154 is releasably locked to the block 52 until the carrier 130 is again moved to its forward position as shown in Fig. 4. Therefore, when the carrier 130 is moved from the position of Fig. 3 to the uncoupled position of Fig. 4, the member 152—154 remains in position relative to the block 52 until the carrier achieves the position of Fig. 4, at which time the balls 176 are permitted, by the reduced finger portion 178, to escape the groove 180. The purpose of mounting the element 152—154 in the manner just described is to assure that the member will be moved to its sealing position relative to the line tube openings 140 and 142.

Figure 7:
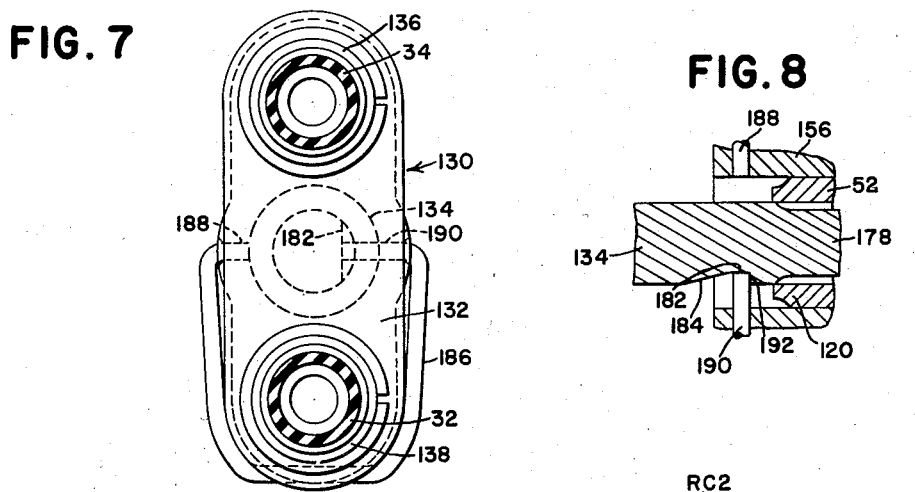
Fig. 7 is a view, partly in section, and drawn to an enlarged scale, as seen along the line 7—7 of Fig. 2.
Figure 8:
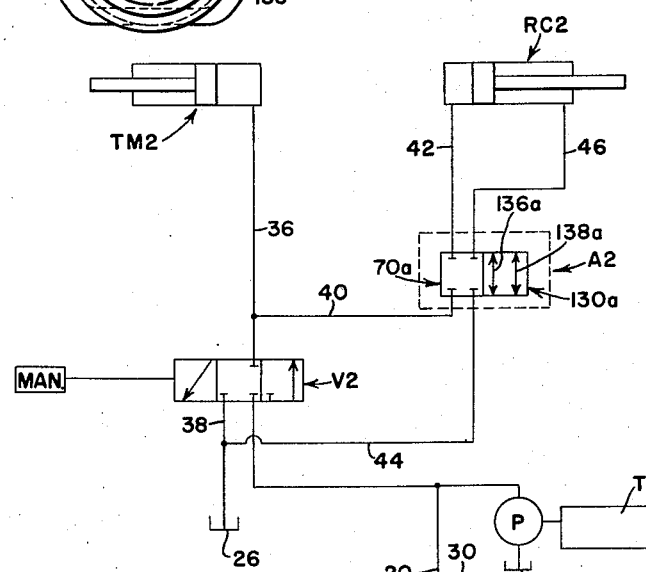
Fig. 8 is a fragmentary section as seen along the line 8—8 of Fig. 4.

In order to prevent inadvertent loss of the member 152—154 from the carrier 130, means is provided as a releasable lock. To this end, one side of the finger 134 has a notch 182 from which a ramp 184 slopes forwardly and outwardly (Figs. 3, 4 and 8). A detent bail 186 is carried by and in depending relation to the body 156 and has opposite legs, one at 188 (Figs. 7 and 8) being relatively short and serving only as a mounting pivot, and the other, at 190 being long enough to serve the dual function of a mounting pivot and a detent lock for engaging the notch 182. This notch has a rear abrupt shoulder 192 which prevents inadvertent camming of the detent 190 out of the notch. The resiliency of the bail 186, which may be typically constructed of spring steel, enables forcible outward displacement of the pin portion 190 to enable deliberate removal of the closure member 152—154—156. The presence of the detent pin 190 is indicated by dotted circles in Figs. 3 and 4.

Although the operation of the coupling, in its movement from coupling to uncoupling position may be clear from the foregoing, it may be well to outline it briefly in connection with the schematic illustration in Fig. 9. In that figure, the remote cylinder RC1 is uncoupled, which is to say that the coupling assembly A1 is in the condition shown in Fig. 4 (or in a condition in which the carrier 130 is removed entirely from the vicinity of the block 52). In other words, it may be assumed that the Fig. 4 position represents a position just prior to coupling, but at this point the cylinder RC1 is not cut into the circuit and therefore the flow of fluid under pressure from the pump will be as indicated and movement of the valve V1 to either side of its central position will effect operation of only the tractor motor TM1. When coupling is effected, as in the Fig. 3 position, the equivalent in the Fig. 9 schematic is movement of the rectangle at A1 to the right so that the two arrows bearing the numerals 136 and 138 respectively connect the lines 28 and 34 and 24 and 32 via the passages 56 and 58, respectively. At this time, the remote cylinder RC1 is cut into the circuit in series with the motor TM1. The circuit may be followed in Fig. 3 by considering that fluid flow from the block passage 28 is via 56, 140, 136 and 34 to one end of the cylinder RC1, and return flow from the right hand end of that cylinder is via 32, 138, 142 and 58 to the other block passage or line 24 and thence to the motor TM1. The coupling assembly features, as already elaborated, the provision for adequate seals where needed, the closure member 152—154 for closing the openings 140 and 142 in the line tubes 136, the releasable interconnection of the finger 134 and pilot member 76 and the releasable and controlled connection between the block extension 150 and the member 152—154. As respects the releasable connection at 126—144, control thereof is effected by the block bore 68. The connection at 176—180 is controlled by the carrier, specifically by the reduced portion 178 and adjacent body portion of the finger 134. The third lock means at 190—182 is manually controlled, as is the detent lock at 104—106, the latter two locks normally preventing inadvertent separation of related parts but enabling deliberate separation of those parts.

Figure 5:
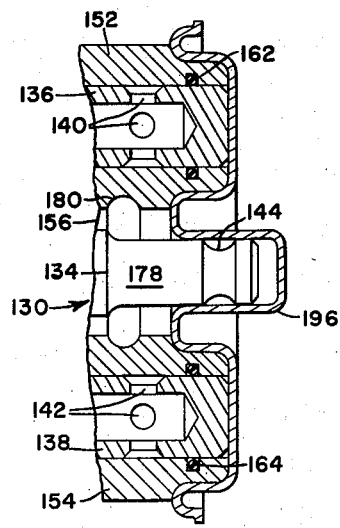
Fig. 5 is a fragmentary section showing that component relating to the remote cylinder as embodying a closure or seal.
Figure 6:
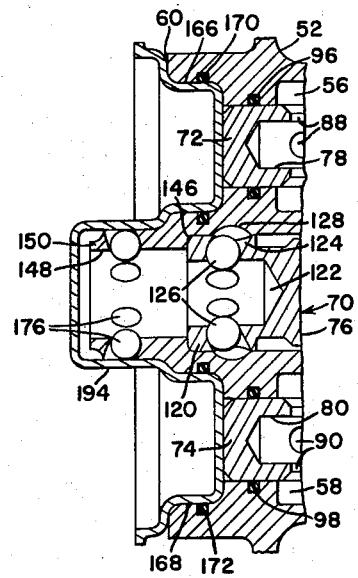
Fig. 6 is a fragmentary section of the tractor-carried component of the assembly, illustrating that component as being covered by a seal or closure.

When the components are completely separated, they may be appropriately covered against the escape of fluid and the entrance of dirt, as best shown in Figs. 5 and 6. For this purpose, a covering member 194, formed of appropriate material and adequately shaped, is received over the block extension 150 and within the block recesses 160 and 168. The material employed is preferably pliable and adapted to return to shape after slight deformation, whereby it is suitably retained on the extension 150 and within the recesses 166 and 168 as illustrated. Similar characteristics apply to a second cover member 196 for the separated carrier 130 and its mounted closure member 152—154. The cover 196 is shaped to fit over the rear ends of the components, as illustrated. When the covers are not in use, they may be nested, which will be clear when one considers that the cover 196, when separated from the structure covered thereby, is placed to the right of the cover 194 when it is separated from its structure, whereupon it will be seen that the portion of the cover 194 that fits within the recesses 166 and 168 will fit within that portion of the cover 196 that accommodates the reduced rear ends of the members 152 and 154 and the central portion of the cover 196 will be readily received by the central portion of the cover 194. However, these details are not important here and are mentioned merely in furtherance of the design effort that has been expended to perfect the coupling assembly.

Figure 10:
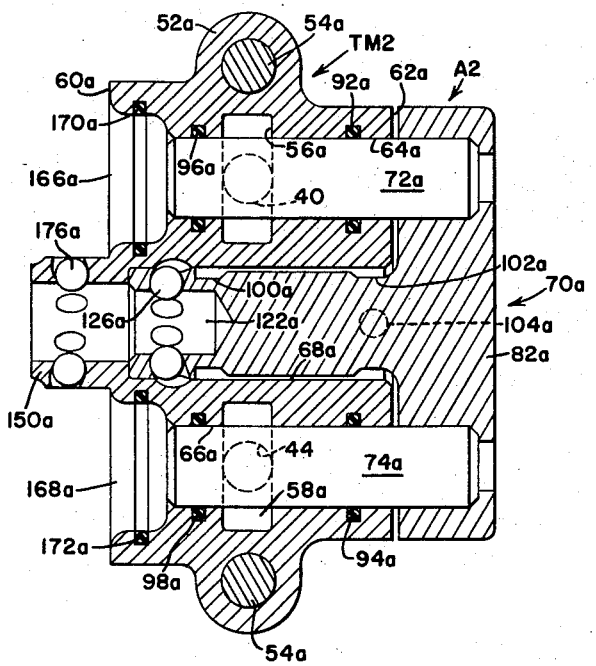
Fig. 10 is a section of a modified tractor-carried component with a modified auxiliary component.

The coupling assembly A2 involves all of the features of the assembly A1, with the exception that it is especially adapted for use in cutting the remote cylinder RC2 into or out of the circuit including the single-acting tractor motor TM2. The largest difference between the two assemblies is that whereas the element 70 in the assembly A1 includes interconnected passages 78—84—80, these passages are not necessary in the A2 assembly. Accordingly, an element 70a having solid plug members 72a and 74a integral with a body 82a is all that is necessary. The carrier 130 of the assembly A1 is usable with the block 52a and element 70a of the A1 assembly, and the characteristics of the latter relative to the former will be readily recognized by the duplication of reference characters to which the exponent "a" has been applied. For example, the block 52a has front and rear ends 60a and 62a respectively, and the front ends afford recesses 166a and 168a for accommodating the reduced rear ends of the closure members 152 and 154. The line tubes 136 and 138 are receivable in the plug bores 64a and 66a to displace the element 70a to its rear position so that block passages 56a and 58a are communicated at 136a and 138a (Fig. 9), with the lines 42 and 46, respectively, of the remote cylinder RC2. In all respects, the interlocks as by the balls 126a and 176a are available, as is the detent action at 100a—104a and 102a—104a. Another distinction between the two assemblies is that in view of the absence of radial oil passages in the plug member 72a and 74a, the rearmost seal 92 may be omitted. Hence, the block 52a need have only the seals 92a and 96a in the upper bore 64a and 94a and 98a for the lower plug bore 66a. As already indicated, since the motor TM2 is single acting, there is no occassion in which it is necessary to interconnect the lines 36 and 38 via the lines 40 and 44 except to the remote cylinder RC2. Therefore, when the coupling assembly occupies its uncoupled status, as represented by Fig. 10, the lines 40 and 44 will terminate at the block 52a, being blockaded by the plug members 72a and 74a. In view of the general identity between the assemblies A1 and A2, it is deemed unnecessary to elaborate further.

Moreover, the operation and functional characteristics of the A2 assembly are substantially identical to those of the A1 assembly, with the exception of the differences already pointed out. In both cases, the numerous features and advantages already outlined are present.

Objects and features other than those categorically enumerated will undoubtedly occur to those versed in the art, as will various modifications and alterations in the preferred embodiments of the invention disclosed, all of which may be achieved without departure from the spirit and scope of the invention.

What is claimed is:

1. A fluid line coupling, comprising: a block having opposite sides, a plug bore and a parallel pilot bore extending therethrough from one side to the other, and a fluid passage intersecting the plug bore; a passage-controlling element at one side of the block and having a plug member and a pilot member axially receivable respectively by the bores and mounted for movement of said element toward and away from the block at said one side respectively between in and out positions, said slug member having an inner portion operative to close and open the block passage respectively in said in and out positions; a carrier at the other side of the block and having a line tube and a finger projecting therefrom toward said other side of the block for receipt respectively by the plug and pilot bores for movement of said carrier toward the block from an uncoupled position to a coupled position, said carrier having abutment means operative upon movement of the carrier to its coupled position to engage the in-positioned element for moving said element to its out position so as to open said block passage, said line tube having adjacent to its terminal end an opening communicable with the opened block passage when the carrier thus attains its coupled position; and lock means cooperative between the carrier finger and element pilot member and effective to interconnect the two as they move in unison to their respective coupled and out positions, said lock means being controlled by the pilot bore to retain the interconnection between said finger and pilot member upon reversal of the carrier so that as the carrier moves to its uncoupled position it draws the element to its in position, said block about said pilot bore being so shaped as to release the lock means substantially as the carrier attains its uncoupled position.

2. The invention defined in claim 1, in which: the opening in the line tube is radially disposed; said tube carries externally thereof a closure member axially slidably mounted thereon at said terminal end to close said opening in the uncoupled position of the carrier and engageable with and stopped by the block so as to incur uncovering of said opening movement of the carrier to its coupled position; and second lock means holding the closure member to the block during uncoupling movement of the carrier so as to incur the closing position of the closure member when movement of the carrier is reversed, said second lock means being then releasable when the carrier attains its uncoupled position and said carried having limit means preventing axial separation of the closure member from the tube so that said closure member remains on the line tube in its closing position when the carrier is uncoupled.

3. The invention defined in claim 2, in which: said block has a pocket coaxial with the plug bore and facing the carrier and the closure member has a portion facing the pocket and shaped to fit the pocket and receivable by said pocket in the coupled position of the carrier.

4. The invention defined in claim 2, in which: the limit means includes a detent normally preventing inadvertent axial movement of the closure member toward the carrier and away from its closing position while the carrier is uncoupled, said detent being yieldable when the closure member engages the block and the carrier is moved to its coupled position in the block.

5. The invention defined in claim 4, in which: said limit means is releasable to enable deliberate removal of the closure member from the line tube.

6. The invention defined in claim 1, in which: said other side of the block has a pocket coaxial with the plug bore and facing the carrier; the opening in the line tube is radially disposed adjacent to the terminal end of said tube; said tube carries externally thereof a closure member axially slidably mounted thereon for movement from a closing position covering said opening in the uncoupled position of the carrier to a shifted position uncovering said opening in the coupled position of the carrier, said closure member having a block-proximate portion shaped to fit the block pocket and receivable in said pocket to be stopped by the block upon insertion of the tube and finger into the plug and pilot bores so as to incur uncovering of said opening upon movement of the carrier to its coupled position; and second lock means holding the closure member to the block during uncoupling movement of the carrier so as to incur the rear position of the closure member when the carrier attains its uncoupled position, said second lock means being then releasable and said carrier having limit means preventing separation of the closure member from the line tube so that said closure member remains on the line tube in its closing position when the carrier is uncoupled.

7. The invention defined in claim 6, including: an nular fluid seal means cooperative between the block pocket and the closure member in the coupled position of the carrier.

8. The invention defined in claim 1, including: means operative to releasably retain the element selectively in its in and out positions.

9. The invention defined in claim 8, in which: said retaining means includes a stop preventing complete separation of the element from the block.

10. The invention defined in claim 9, in which: the stop is releasable to enable deliberate separation of the element from the block.

11. The invention defined in claim 1, in which: the lock means comprises: an axial pocket in the front end of the pilot member and facing the carrier and affording a radial wall portion on said pilot member within the pilot bore, said wall having a detent opening radially therethrough; a recess in the pilot bore in radial register with said detent opening in the in position of the element; a detent in the detent opening and having a radial dimension greater than the wall; said finger having a terminal end portion insertable in the pilot member pocket to initially displace the detent radially outwardly into the recess, said terminal end portion of the finger having a relief therein for receiving part of the detent upon further movement of the carrier relative to the block in its coupling direction, the pilot bore beyond the recess in the direction toward the element serving to hold the detent positively in engagement with said relief to incur movement of the carrier and rear element in unison in both axial directions except when the detent registers with the recess.

12. A fluid line coupling, comprising: a block having opposite sides, a pair of plug bores and a pilot bore extending therethrough in parallelism from one side to the other, and a pair of fluid passages respectively intersecting the plug bores; a passage-controlling element at one side of the block and having a body and a pair of plug members and a pilot member fixed to and projecting from said body and axially receivable respectively by the bores for movement of said element toward and away from the block at said one side respectively between in and out positions, each plug member having an inner portion operative to close and open the respective block passage respectively in said in and out positions; a carrier at the other side of the block and having a pair of line tubes and a finger projecting therefrom toward said other side of the block for receipt respectively by the plug and pilot bores for movement of said carrier toward the block from an uncoupled position to a coupled position, said carrier having abutment means operative upon movement of the carrier to its coupled position to engage the in-positioned element for moving said element to its out position so as to open said block passages, each line tube having adjacent to its terminal end an opening communicable with the respective opened block passage when the carrier thus attains its coupled position; and lock means cooperative between the carrier finger and element pilot member and effective to interconnect the two as they move in unison to their respective coupled and out positions, said lock means being controlled by the pilot bore to retain the interconnection between said finger and pilot member upon reversal of the carrier so that as the carrier moves to its uncoupled position it draws the element to its in position, said block about said pilot bore being so shaped as to release the lock means substantially as the carrier attains its uncoupled position.

13. The invention defined in claim 12, in which: each plug member is closed at its inner portion and has an axial passage therein extending from said inner portion to the body, said body having a passage cross-connecting the plug member passages, and each plug member has adjacent to its inner portion a radial opening registrable with the respective fluid passage in the block in only the in position of said element.

14. The invention defined in claim 12, in which: each plug member is operative in only the in position of the element to cover the respective fluid passage in the block.

15. The invention defined in claim 12, in which: the opening in each line tube is radially disposed adjacent to the terminal end of said tube; each tube carries externally thereof a closure member axially slidably mounted thereon at said terminal end to close said opening in the uncoupled position of the carrier and engageable with and stopped by the block so as to incur uncovering of said opening upon movement of the carrier to its coupled position; and second lock means holding the closure members to the block during uncoupling movement of the carrier so as to incur the closing positions of the closure members when the carrier attains its uncoupled position, said second lock means being then releasable and said carrier having limit means preventing axial separation of the closure members from the line tube so that said closure members remain on the line tube in their closing positions when the carrier is uncoupled.

16. A fluid line coupling, comprising: a block having opposite sides, a plug bore and a parallel pilot bore extending therethrough from one side to the other, and a fluid passage intersecting the plug bore; a passage-controlling element at one side of the block and having a plug member and a pilot member axially receivable respectively by the bores and mounted for movement of said element toward and away from the block at said one side respectively between in and out positions, said plug member having an inner portion operative to close and open the block passage respectively in said in and out positions; and a carrier at the other side of the block and having a line tube and a finger projecting therefrom toward said other side of the block for receipt respectively by the plug and pilot bores for movement of said carrier toward the block from an uncoupled position to a coupled position, said carrier having abutment means operative upon movement of the carrier to its coupled position to engage the in-positioned element for moving said element to its out position so as to open said block passage, said line tube having adjacent to its terminal end an opening communicable with the opened block passage when the carrier thus attains its coupled position.

17. The invention defined in claim 16, in which: the opening in the line tube is radially disposed; said tube carries externally thereof a closure member axially slidably mounted thereon at said terminal end to close said opening in the uncoupled position of the carrier and engageable with and stopped by the block so as to incur uncovering of said opening upon movement of the carrier to its coupled position; and releasable means holding the closure member to the block during uncoupling movement of the carrier so as to incur the closing position of the closure member when movement of the carrier is reversed, said releasable means being then releasable when the carrier attains its uncoupled position and said carrier having limit means preventing axial separation of the closure member from the tube so that said closure member remains on the line tube in its closing position when the carrier is uncoupled.

18. The invention defined in claim 17, in which: said block has a pocket coaxial with the plug bore and facing the carrier and the closure member has a portion facing the pocket and shaped to fit the pocket and receivable by said pocket in the coupled position of the carrier.

19. The invention defined in claim 17, in which: the limit means includes a detent normally preventing inadvertent axial movement of the closure member toward the carrier and away from its closing position while the carrier is uncoupled, said detent being yieldable when the closure member engages the block and the carrier is moved to its coupled position in the block.

20. The invention defined in claim 19, in which: said limit means is releasable to enable deliberate removal of the closure member from the line tube.

21. A fluid line coupling, comprising: a block having opposite sides, a pair of plug bores and a pilot bore extending therethrough in parallelism form one side to the other, and a pair of fluid passages respectively intersecting the plug bores; a passage-controlling element at one side of the block and having a body and a pair of plug members and a pilot member fixed to and projecting from said body and axially receivable respectively by the bores for movement of said element toward and away from the block at said one side respectively between in and out positions, each plug member having an inner portion operative to close and open the respective block passage respectively in said in and out positions; and a carrier at the other side of the block and having a pair of line tubes and a finger projecting therefrom toward said other side of the block for receipt respectively by the plug and pilot bores for movement of said carrier toward the block from an uncoupled position to a coupled position, said carrier having abutment means operative upon movement of the carrier to its coupled position to engage the in-positioned element for moving said element to its out position so as to open said block passages, each line tube having adjacent to its terminal end an opening communicable with the respective opened block passage when the carrier thus attains its coupled position.

22. The invention defined in claim 21, in which: each plug member is closed at its inner portion and has an axial passage therein extending from said inner portion to the body, said body having a passage cross-connecting the plug member passages, and each plug member has adjacent to its inner portion a radial opening registrable with the respective fluid passage in the block in only the in position of said element.

23. A fluid line coupling, comprising: a block having opposite sides, a pair of plug bores extending therethrough in parallelism from one side to the other, and a pair of fluid passages respectively intersecting the plug bores; a passage-controlling element at one side of the block and having a body and a pair of plug members fixed to and projecting from said body and axially receivable respectively by the bores for movement of said element toward and away from the block at said one side respectively between in and out positions, each plug member having an inner portion operative to close and open the respective block passage respectively in said in and out positions, each plug member having an internal passage open to the respective block passage when the element is in its in position and said body having a cross passage interconnecting the plug member passages; and a carrier at the other side of the block and having a pair of line tubes projecting therefrom toward said other side of the block for receipt respectively by the plug bores for movement of said carrier toward the block from an uncoupled position to a coupled position, said carrier having abutment means operative upon movement of the carrier to its coupled position to engage the in positioned element for moving said element to its out position so as to open said block passages, each line tube having adjacent to its terminal end an opening communicable with the respective opened block passage when the carrier thus attains its coupled position.

References Cited in the file of this patent

UNITED STATES PATENTS

| | | |
|---|---|---|
| 1,968,421 | Proctor | July 31, 1934 |
| 2,612,389 | MacGlashan | Sept. 30, 1952 |
| 2,619,367 | Hanson | Nov. 25, 1952 |
| 2,625,168 | Charlson | Jan. 13, 1953 |
| 2,638,915 | Mitchell | May 19, 1953 |